Figure 24:
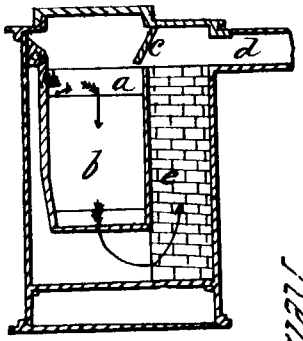
Figure 23:
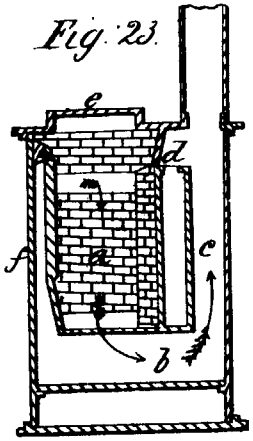
Figure 22:
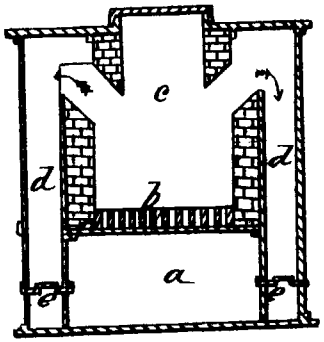
Figure 21:
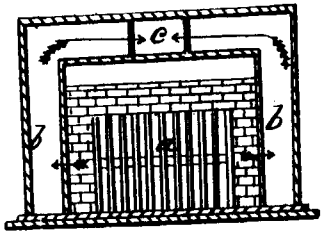

126. STOVES & FURNACES,
Stoves, Heating, Magazine.
73
8
Sheet 1 - 5 Sheets.
E. Nott.
Magazine Stove.
77X
Reissued Oct. 17, 1835
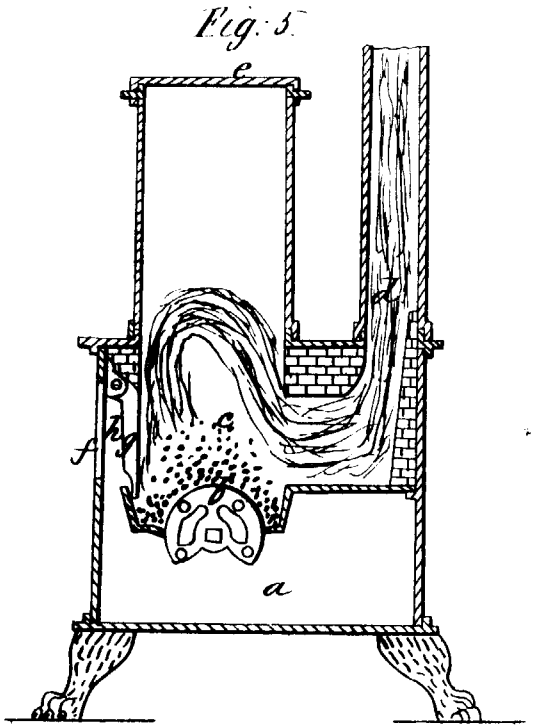
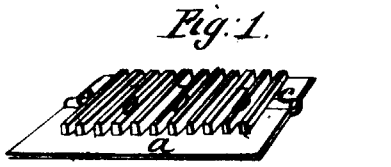
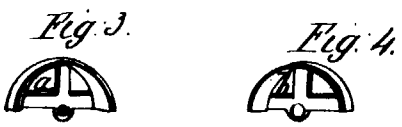
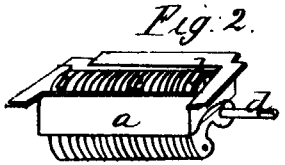
N. PETERS, PHOTO-LITHOGRAPHER, WASHINGTON, D. C.

126 STOVES & FURNACES,
Stoves, Heating, Magazine,
EXAMINER.
E. Nott. Sheet 2-5 Sheets.
Magazine Stove.
Reissued Oct. 17, 1835.
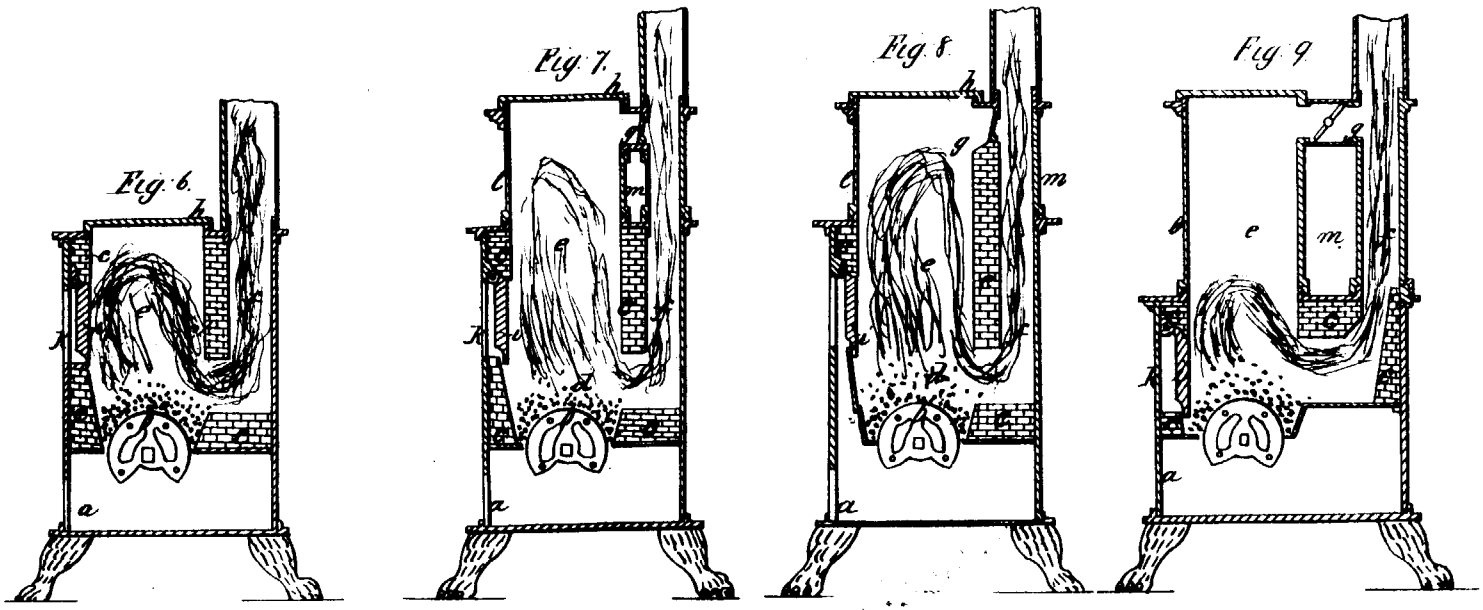
H. PETERS, PHOTO-LITHOGRAPHER, WASHINGTON, D. C.

126. STOVES & FURNACES,
Stoves, Heating, Magazine,
73
EXAMINER.
Sheet 3-5 Sheets.
E. Nott.
Magazine Stove.
77X
Reissued Oct. 17, 1835.
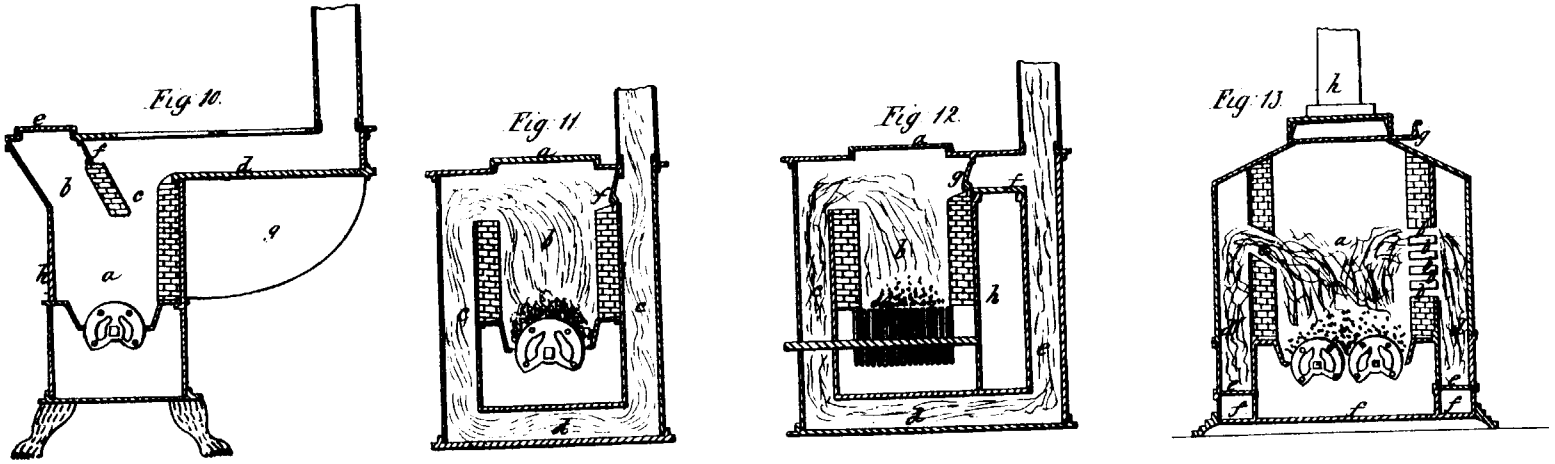
H. PETERS, PHOTO-LITHOGRAPHER, WASHINGTON, D. C.

EXAMINER.
Sheet 4 - 5 Sheets.
E. Nott.
Magazine Stove.
77*
Reissued Oct. 17, 1835
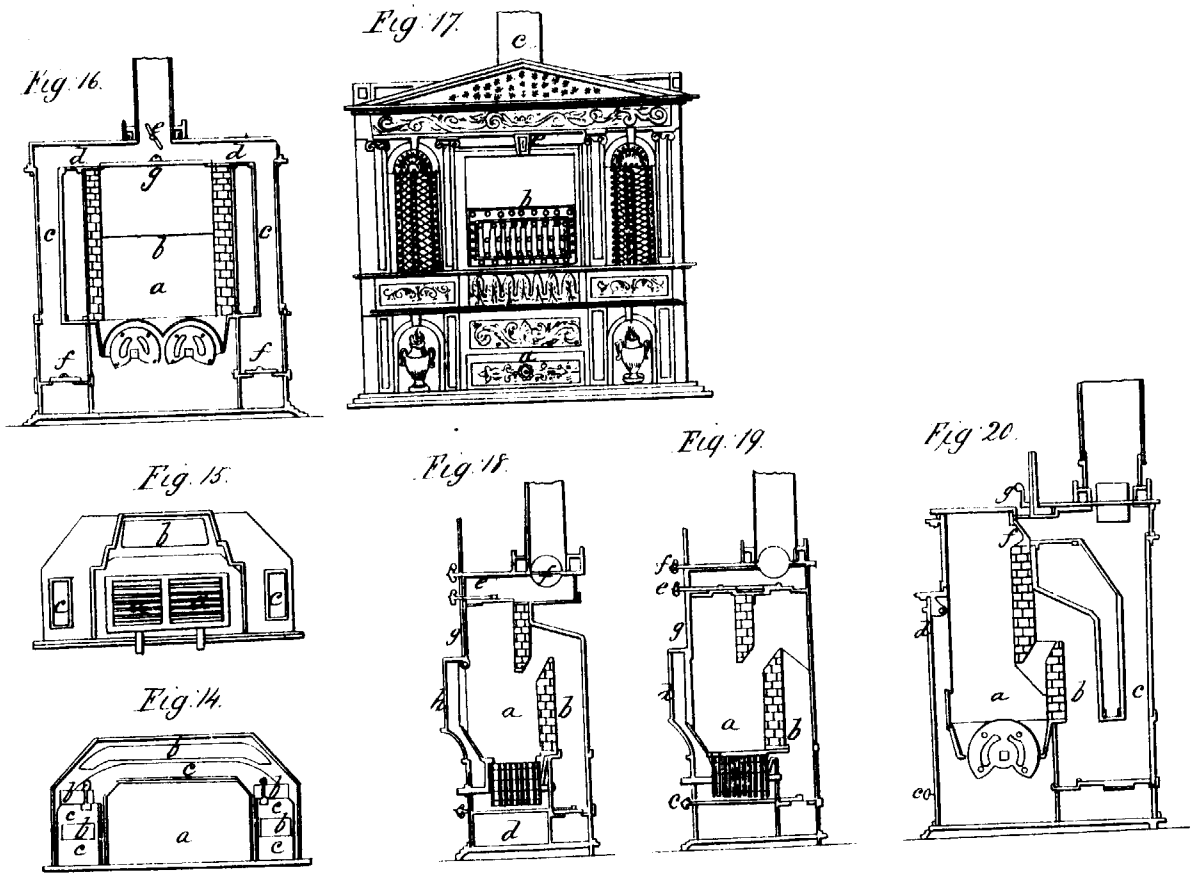
N. PETERS, PHOTO-LITHOGRAPHER, WASHINGTON D. C.

126. STOVES & FURNACES.
Stoves, Heating, Magazine,
73

EXAMINER.

Sheet 5-5 Sheets.

E. Nott.

Magazine Stove.

77 ✗

Reissued Oct. 17, 1835.

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # Rx77 FOR ISSUE DATE 10-17-1835

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa